US006792180B1

(12) United States Patent
Wu

(10) Patent No.: US 6,792,180 B1
(45) Date of Patent: Sep. 14, 2004

(54) OPTICAL COMPONENT HAVING FLAT TOP OUTPUT

(75) Inventor: Chi Wu, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 5 days.

(21) Appl. No.: 10/101,481

(22) Filed: Mar. 19, 2002

Related U.S. Application Data
(60) Provisional application No. 60/278,657, filed on Mar. 20, 2001.

(51) Int. Cl.[7] .................................................. G02B 6/34
(52) U.S. Cl. ......................................... 385/37; 385/140
(58) Field of Search ............................ 385/15, 24, 27, 385/37, 39, 46, 48, 50, 140

(56) References Cited

U.S. PATENT DOCUMENTS

| | | |
|---|---|---|
| 4,618,210 A | 10/1986 | Kondo |
| 4,747,654 A | 5/1988 | Yi-Yan |
| 4,813,757 A | 3/1989 | Sakano et al. |
| 4,846,542 A | 7/1989 | Okayama |
| 4,857,973 A | 8/1989 | Yang et al. |
| 4,995,689 A | 2/1991 | Sarraf |
| 5,002,350 A | 3/1991 | Dragone |
| 5,013,113 A | 5/1991 | Soref |
| 5,039,993 A | 8/1991 | Dragone |
| 5,243,672 A | 9/1993 | Dragone |
| 5,412,744 A | 5/1995 | Dragone |
| 5,450,511 A | 9/1995 | Dragone |
| 5,467,418 A | 11/1995 | Dragone |
| 5,581,643 A | 12/1996 | Wu |
| 5,706,377 A | 1/1998 | Li |
| 5,841,919 A * | 11/1998 | Akiba et al. .................. 385/37 |
| 5,841,931 A | 11/1998 | Foresi et al. |
| 5,938,811 A | 8/1999 | Greene |
| 5,940,548 A * | 8/1999 | Yamada et al. ................ 385/14 |
| 6,108,478 A | 8/2000 | Harpon et al. |
| 6,115,518 A | 9/2000 | Clapp |
| 6,118,909 A | 9/2000 | Chen et al. |
| 6,124,145 A | 9/2000 | Stemme et al. |
| 6,339,664 B1 * | 1/2002 | Farjady et al. ................. 385/37 |
| 6,374,013 B1 * | 4/2002 | Whiteaway et al. ........... 385/37 |
| 6,442,308 B1 * | 8/2002 | Han et al. ....................... 385/24 |
| 2001/0046363 A1 * | 11/2001 | Purchase et al. ............. 385/140 |
| 2002/0131684 A1 * | 9/2002 | Doerr ........................... 385/24 |
| 2002/0181868 A1 * | 12/2002 | McGreer ....................... 385/37 |

FOREIGN PATENT DOCUMENTS

| | | |
|---|---|---|
| EP | 0306956 A2 | 3/1989 |
| EP | 0647861 A1 | 4/1995 |
| EP | 0985942 A2 | 3/2000 |
| GB | 2318211 A | 4/1998 |
| JP | 63165816 | 7/1988 |

(List continued on next page.)

OTHER PUBLICATIONS

"Arrâyed–waveguide grating multiplexer with flat spectral response", Okamoto et al, Optics Letters, Jan. 1, 1995, vol. 20, No. 1.*

(List continued on next page.)

*Primary Examiner*—Hemang Sanghavi
*Assistant Examiner*—Scott A Knauss
(74) *Attorney, Agent, or Firm*—Law Offices of Travis L. Dodd, P.C.

(57) ABSTRACT

The optical component includes an array of array waveguides. The optical component also includes a first light distributing component configured to distribute a first light signal to the array waveguide. The first light signal is distributed such that a fraction of the first light signal enters each array waveguide as a light signal fraction. The optical component also includes a second light distribution component configured to received the light signal fractions from the array waveguides. The light signal fractions are received so they combine to from a second light signal with a periodic intensity distribution.

32 Claims, 10 Drawing Sheets

FOREIGN PATENT DOCUMENTS

| JP | 63-197923 | 8/1988 | |
|---|---|---|---|
| JP | 2-179621 | 7/1990 | |
| JP | 6-186598 | 7/1994 | |
| JP | 6326420 | 11/1994 | |
| JP | 11352343 A | * 12/1999 | ............ G02B/6/12 |
| WO | WO 97/09654 | 3/1997 | |
| WO | WO 00/57222 | 9/2000 | |

OTHER PUBLICATIONS

Abe, et al., Optical Path Length Trimming Technique using Thin–Film Heaters for Silica–Based Waveguides on Si, Electronics Letters, Sep. 12, 1996, vol. 32, No. 19, pp. 1818–1820.

Albert, J., Planar–Fresnel Lens Photoimprinted in a Germanium–Doped Silica Optical Waveguide, Optics Letters, May 15, 1995, vol. 20, No. 10, pp. 1136–1138.

Aman, M.C., Calculation of Metal–Clad Ridge–Waveguide (MCRW) Laser Modes by Coupling Technique, Journal of Lightwave Technology, vol. LT–4, No. 6, Jun. 1986, p. 689–693.

Amann, M.C. et al, Calculation Of The Effective Refractive–Index Step For The Metal–Cladded–Ridge–Waveguide Laser, Applied Optics, vol. 20, No. 8, Apr. 15, 1981, pp. 1483–1486.

Baba, S. et al., A Novel Integrated–Twin–Guide (ITG) Optical Switch with a Built–in TIR Region; IEEE Photonics Technology Letters; vol. 4, No. 5, May 1992, pp. 486–488.

Benson, T.M., Etched–Wall Bent–Guide Structure for Integrated Optics in the III–V Semiconductors; Journal of Lightwave Technology, vol. LT–2, No. 1, Feb. 1984; p. 31–34.

Berry, G.M. et al., Analysis Of Multiplayer Semiconductor Rib Waveguides With High Refractive Index Substrates, Electronics Letters; vol. 29, No. 22, Oct. 28, 1993, p. 1941–1942.

Betty, I. et al., A Robust, Low–Crosstalk, InGaAsP/InP Total–Internal–Reflection Switch For Optical Cross–Connect Application.

Burke, S.V., Spectral Index Method Applied to Coupled Rib Waveguides; Electronics Letters, vol. 25, No. 9, Apr. 27, 1989, p. 605–606.

Burns, W.K. et al., Mode Conversion in Planar–Dielectric Separating Waveguides; IEEE Journal of Quantum Electronics, Vol. QE–11, No. 1, Jan. 1975; p. 32–39.

Cai, Y. et al., A Novel Three–Guide Optical Coupler Using A Taper–Formed Waveguide; j. Appl. Phys 69(5), Mar. 1991; p. 2810–2814.

Cavailles, J.A. et al., First Digital Optical Switch Based on InP/GaInAsP Double Heterostructure Waveguides; Electronics Letters, vol. 27, No. 9, Apr. 25, 1991, p. 699–700.

Chen, R.T. et al., Design and Manufacturing of WDM Devices; Proceedings of SPIE vol. 3234.

Clemens, et al., Wavelength–Adaptable Optical Phased Array in $SiO_2$–Si, Photonics Technology Letters, Oct. 1995, vol. 7, No. 10, 1040–1041.

Dagli, N. et al., Analysis of Rib Dielectric Waveguides; IEEE Journal of Quantum Electronics, vol. QE–21, No. 4, Apr. 1985, p. 315–321.

Dagli, N. et al., Theoretical and Experimental Study of the Analysis and Modeling of Integrated Optical Components; IEEE Journal of Quantum electronics, vol. 24, No. 11, Nov. 1988; p. 2215–2226.

Deri, R.J., et al., Low–Loss GaAs/AlGaAs Waveguide Phase Modulator Using A W–Shaped Index Profile; Sep. 6, 1988.

Deri, R.J., et al., Low–Loss Multiple Quantum Well GaInAs/InP Optical Waveguides; Feb. 21, 1989.

Devaux, F. et al., 20Gbit/s Operation of a High–Efficiency InGaAsP/InGaAsP MQW Electroabsorption Modular With 1.2–V Drive Voltage; IEEE Photonics Technology Letters, vol. 5, No. 11, Nov. 1993, p. 1288–1290.

Doerr, C.R. et al., Chirping Of The Waveguide Grating Router For Free–Spectral–Range Mode Selection In The Multifrequency Laser, IEE Photonics Technology Letters, Apr. 1996, vol. 8, No. 4, pp 500–502.

Doerr, C.R. et al., *Chromatic Focal lane Displacement in the Parabolic Chirped Waveguide Grating Router,* May 1997, vol. 9, No. 5, pp 625–627.

Dragone, c. Efficient NxN Star Couplers Using Fourier Optics, pp 479–48, Mar. 1989, vol. 7, No. 3, Journal of Lightwave Technology.

Fischer, et al., Singlemode Optical Switches Based on SOI Waveguides with Large Cross–Section, Electronics Letters, Mar. 3, 1994, vol. 30, No. 5, pp. 406–408.

Fischer, K. et al., Sensor Application of SiON Integrated Optical Waveguides On Silicon; Elevier Sequoia, 1992; p. 209–213.

Fish, G. et al., Monolithic InP Optical Crossconnects: 4x4 and Beyond, JWB2–1, p. 19–21.

Furuta, H. et al, Novel Optical Waveguide For Integrated Optics, Applied Optics, vol. 12, No. 2, Feb. 1974, p. 322–326.

Gini, E. et al., Low Loss Self–Aligned Optical Waveguide Corner Mirrors in InGaAsP/InP, We P2.22.

Goel, K. et al Design Considerations for Low Switching Voltage Crossing Channel Switches; Journal of Lightwave Technology, vol. 6, No. 6, Jun. 1988; p. 881–886.

Granestrand, P. et al., Integrated Optics 4x4 Switch Matrix with Digital Optical Switches; Electronics Letters, vol. 26, No. 1, Jan. 4, 1990; p. 4–5.

Himeno, A. et al., Loss Measurement and Analysis of High–Silica Reflection Bending Optical Waveguides, Journal of Lightwave Technology, Jan. 1988, vol. 6, No. 1, 41–46.

Hsu, K.Y. et al., Photonics devices and Modules, www.c-c.nctu.edu.tw/~ctr/lee_mti/research_topic/photonic_devices_modules.htm, pp. 1–3.

Huang, T.C. et al., Depletion Edge Translation Waveguide Optical Switch; IEEE Photonics Technology Letters, vol. 1, No. 7, Jul. 1989, p. 168–170.

Hutcheson, L.D. et al., Comparison of Bending Losses in Integrated Optics Circuits; Optics Letters, vol. 5, No. 6, Jun. 1980, p. 360–362.

Inoue, H. et al, Low Loss GaAs Optical Waveguides, Journal of Lightwave Technology, vol. LT–3, No. 6, Dec. 1985; p. 204–209.

Irace, A. et al., Fast Silicon–on–Silicon Optoelectronic Router Based on a BMFET Device, Journal of Selected Topics in Quantum Electronics, Jan./Feb. 2000, vol. 6, No. 1, pp. 14–18.

Ito, F. et al., Carrier–Injection–Type Optical Switch In GaAs With A 1.06–1.55 $\mu$m Wavelength Range; Appl. Physics Letters, 54(2), Jan. 9, 1989; p. 134–136.

Jackman, N. et al., Optical Cross Connects for Optical Networking; Bell Labs Technical Journal, Jan.–Mar. 1999; p. 262–281.

Johnston, I.R. et al., Silicon–Based Fabrication Process For Production Of Optical Waveguides; IEE Proc–Optoelectron., vol. 143, No. 1, Feb. 1996, p. 37–40.

Kaenko, A. et al., Athermal Slice–based Arrayed–waveguide Grating (AWG) Multiplexers with New Low Loss Groove Design; TuO1.1, p. 204–206.

Kasahara, R. et al., Low–Power Consumption Slice–Based 2x2 Thermooptic Switch Using Trenched Silicon Substrate, IEEE Photonics Technology Letters, vol. 11, No. 9, Sep. 1999, p. 1132–1134.

Khan, M.N. et al., Fabrication–Tolerant, Low–Loss, and High–Speed Digital Optical Switches in InGaAsP/InP Quantum Wells; Proc $21^{st}$ Eur.Conf.onOpt Comm. (ECOC '95—Brussels), p. 103–106.

Khan, M.N. et al., High–Speed Operation of Quantum Well Electron Transfer Digital Optical Switches, p. 102–102c.

Kirihara, T. et al., Lossless And Low Crosstalk 4x4 Optical Switch Array; Electronics And Communications in Japan, Part 2, vol. 77, No. 11, 1994, p. 73–81.

Kirihara, T. et al., Lossless and Low–Crosstalk Characteristics In an InP–Based 2x2 Optical Switch, IEEE Photonics Technology Letters, vol. 5, No. 9, Sep. 1993, p. 1059–1061.

Kokubun, Y. et al., Athermal Waveguides for Temperature–Independent Lightwave Devices, Nov. 1993, 1297–1298, vol. 5, No. 11, IEEE Photonics Technology Letters.

Kokubun, Y. et al., Temperature–Independent Narrowband Optical Fiber at 1.3 $\mu$m Wavelength by an Athermal Waveguide, Oct. 10, 1996, vol. 32, No. 21, Electronics Letters.

Kokubun, Y. et al., Temperature–Independent Optical Filter at 1.55 $\mu$m Waveguide Using a Slice–Based Athermal Waveguide, Feb. 19, 1998, vol. 34, No. 4, Electronics Letters.

Kokubun, Y. et al., Three–Dimensional Athermal Waveguides for Temperature Independent Lightwave Devices, Jul. 21, 1994, vol. 30, No. 5, Electronics Letters.

Kostrzewa, C. et al., Tunable Polymer Optical Add/Drop Filter for Multiwavelength Networks; Photonics Technology Letters, Nov. 1997, vol. 9, No. 11, 1487–1489..

Laakman, K. D. et al., Waveguides: Characteristic Modes Of Hollow Rectangular Dielectric Waveguides; Applied Optics, vol. 15, No. 5, May 1976; p. 1334–1340.

Lee, T.P. et al., $Al_xGa_{1-x}As$ Double–Heterostructure Rib–Waveguide Injection Laser, IEEE Journal of Quantum Electronics; vol. QE–11, No. 7, Jul. 1975; p. 432–435.

Liu, Y.L. et al., Silicon 1x2 Digital Optical Switch Using Plasma Dispersion; Electronics Letters, vol. 30, No. 2, Jan. 20, 1994; p. 130–131.

Mak, G. et al., High–Speed Bulk InGaAsP—InP Electroabsorption Modulators with Bandwidth in Excess of 20 GHz, IEEE Photonics Technology Letter, vol. 2, No. 10, Oct. 1990, p. 730–733.

Marcatili, E., Improved Coupled–Mode Equations for Dielectric Guides; IEEE Journal of Quantum Electronics, vol. QE–22, No. 6, Jun. 1986; p. 988–993.

Marcatili, E.A.J., Bends in Optical Dielectric Guides; The Bell System Technical Journal, Sep. 1969, p. 2103–2132.

Marcatilli, E.A.J., Dielectric Rectangular Waveguides and Directional Coupler for Integrated Optics, The Bell System Technical Journal, Sep. 1969 p. 2071–2101.

Marcatili, E.A.J., Slab–Coupled Waveguides; The Bell System Technical Journal, Apr. 1974; American Telephone & Telegraph Company, vol. 53, No. 4, Apr. 1974.

Mirza, A.R. et al, Silicon Wafer Bonding For MEMS Manufacturing, Solid State Technology, Aug. 1999, p. 73–78.

Moerman, I. et al., A Review of Fabrication Technologies for the Monolithic Integration of Tapers with III–V Semiconductor Devices; IEEE Journal of Selected Topics in Quantum electronics, vol. 3, No. 6, Dec. 1997, p. 1308–1320.

Müller, G. et al., First Low Loss InP/InGaAsP Optical Switch with Integrated Mode Transformers; ThC12.10; p. 37–40.

Nayyer, J. et al., Analysis of Reflection–Type Optical Switches with Intersecting Waveguides, Journal of Lightwave Technology, vol. 6, No. 6, Jun. 1988, pp. 1146–1152.

Negami, t. et al., Guided–Wave Optical Wavelength Demultiplexer Using An Asymmetric Y Junction; Appl. Phys. Lett. 54(12), Mar. 20, 1989; p. 1080–1082.

Nelson, W. et al., Optical Switching Expands Communications–Network Capacity; Laser Focus World, Jun. 1994, p. 517–520.

Nelson, W.H. et al., Wavelength–and Polarization–Independent Large Angle InP/InGaAsP Digital Optical Switches with Extinction Ratios Exceeding 20 dB; IEEE Photonics Technology Letters, vol. 6, No. 11, Nov. 1994; p. 1332–1334.

Noda, Y. et al., High–Speed Electroabsorption Modulator with Strip–Loaded GaInAsP Planar Waveguide; Journal of Lightwave Technology, vol. Lt–4, No. 10, Oct. 1986, p. 1445–1453.

Offrein, B.J. et al. Resonant Coupler–Based Tunable Add––After–Drop Filter in Silicon–Oxynitrite Technology for WDM Networks, Journal of Selected Topics in Quantum Electronics, vol. 5, No. 5, 1400–1405.

Okamoto, K. et al, Arrayed–Waveguide Grating Multiplexer With Flat Spectral Response; Optics Letters, Jan. 1, 1995; vol. 20, No. 1; p. 43–45.

Okamoto, K. et al., Flat Spectral Response Arrayed–Waveguide Grating Multiplexer with Parabolic Waveguide Horns, Electronics Letters Online, Jul. 15, 1996, No. 19961120, pp. 1661–1662.

Okayama, H. et al., 8x8 Ti:LiNbO$_3$ Waveguide Digital Optical Switch Matrix, IEICE Trans. Commun.; vol. E77–B, No. 2, Feb. 1994, p. 204–208.

Okayama, H. et al., Reduction of Voltage–Length Product for Y–Branch Digital Optical Switch, Journal of Lightwave Technology, vol. 11, No. 2, Feb. 1993, p. 379–387.

Okuno, M. et al., Strictly Nonblocking 16x16 Matrix Switch Using Silica Based Planar Lightwave Circuits, vol. 10, No. 266, Sep. 11, 1986.

Ooba, N. et al., Athermal Silica–Based Arrayed–Waveguide Grating Multiplexer Using Bimetal Plate Temperature Compensator, Electronics Letters, Oct. 12, 2000, vol. 36, No. 21, pp. 1800–1801.

Renaud, M. et al., Compact Digital Optical Switches for Low Insertion Loss Large Switch Arrays on InP, Proc. $21^{st}$ Eur.Conf.on Opt. Comm. (ECOC '95—Brussels), p. 99–102.

Rickman, A.G. et al., Silicon–on–Insulator Optical Rib Waveguide Loss and Mode Characteristics, Journal of Lightwave Technology, Oct. 1994, vol. 12, No. 10, pp. 1771–1776.

Rolland, C. et al., 19 Gbit/s, 1.56 $\mu$m, Multiquantum Well InP/InGaAsP Mach–Zehnder Optical Modulator; Electronics Letters, Mar. 4, 1993, vol. 29, No. 5, p. 471–472.

Santec Sales Brochure for year 2000 entitled "Optical Components".

Schauwecker, B. et al, Small–Size Silicon–Oxynitride AWG Demultiplexer Operating Around 725 nm, IEEE Photonics Technology Letters, vol. 12, No. 12, Dec. 2000.

Schlachetzki, A. Monolithic IO–Technology–Modulators and Switches Based on InP; SPIE vol. 651 Integrated Circuit Engineering III (1986), p. 60–86.

Silberberg, Y. et al., Digital Optical Switch; Appl. Phys. Lett; vol. 51, No. 16, Oct. 19, 1987, p. 152–154.

Smit, M.K., New Focusing and Dispersive Planar Component Based on an Optical Phased Array, Electronics Letters; Mar. 31, 1988, vol. 24, No. 7, p. 385–386.

Smith, S.D. et al., CW Operation of Corner Cavity Semiconductor Lasers; IEEE Photonics Technology Letters, vol. 5, No. 8, Aug. 1993; p. 876–879.

Sneh, A. et al., Compact Low Crosstalk and Low Propagation Loss Quantum–Well Y–Branch Switches; PDP 4–1–4–5.

Soole, J.B.D. et al., Use of Multimode Interference Couplers to Broaden the Passband of Wavelength–Dispersive Integrated WDM Filters; IEEE Photonics Technology Letters, vol. 8, No. 10, Oct. 1996, p. 1340–1342.

Stoll, L. et al., 1:8 Optical Matrix Switch on InP/InGaAsP with Integrated Mode Transformers; Optical Switches and Modulators II, p. 531–534.

Stoll, L. et al., Compact and Polarization Independent Optical Switch on InP/InGaAsP; TuB7.2, p. 337–340.

Stutius, W. et al., Silicon Nitride Films On Silicon For Optical Waveguides, Applied Optics, vol. 16, No. 12, Dec. 1977, p. 303–307.

Sugie, T. et al., 1.3–$\mu$m Laser Diodes with a Butt–jointed Selectivity Grown Spot–Size Converter; ThB2–06, IOOC95, p. 52–53.

Tada, K. et al., Bipolar Transistor Carrier–Injected Optical Modulator/Switch: Proposal and Analysis, IEEE Electron Device Letters, vol. EDL–7, No. 11, Nov. 1986, p. 605–606.

Takada, et al., Optical Spectrum analyzer using Cascaded AWG's with Different Channel Spacings, Photonics Technology Letters, Jul. 1999, vol. 11, No. 7, pp. 863–864.

Takahashi, H. et al., Arrayed Waveguide Grating for Wavelength Division Multi/Demultiplexer with Nanometre Resolution, PWG–NTT–7.

Takiguchi, K. et al., Dispersion Compensation Using a Planar Lightwave Circuit Optical Equalizer, Photonics Technology Letters, Apr. 1994, vol. 6, No. 4, pp. 561–564.

Tien, P.K. et al., Formation of Light–Guiding Interconnections in an Integrated Optical Circuit by Composite Tapered– Film Coupling; Applied Optics, vol. 12, No. 8, Aug. 1973, p. 1909–1916.

Toyoda et al., Thermoplastic Switch and Wavelength Tunable Filter using Polymer Waveguides, Abstract of paper presented at Opticomm 2001 on Aug. 22, 2001.

Treyz, G.V. et al., Silicon Optical Modulators at 1.3 $\mu$m Based on Free–Carrier Absorption; IEEE Electron Device Letters, vol. 12, No. 6, Jun. 1991, p. 276–278.

Tsuda, H. et al., Performance Analysis of a Dispersion Compensator Using Arrayed–Waveguide Gratings, Journal of Lightwave Technology, Aug. 2000, vol. 18, No. 8, pp. 1139–1147.

Tsude, H. et al., Second– and Third–Order Dispersion Compensator Using a High–Resolution Arrayed Waveguide Grating, IEEE Photonics Technology Letters, May 1999, vol. 11, No. 5, 569–571.

Vinchant et al., InP 4x4 Digital–Optical–Switch Module For Multiwavelength Cross–Connect Applications; OFC '95 Technical Digest, Thursday ThK2, p. 281–282.

Vinchant, J.F. et al., First Polarisation insensitive 4x4 Switch matrix on InP with Digital Optical Switches, TuB7.3, p. 341–344.

Vinchant, J.F. et al., InP Digital Optical Switch: Key Element for Guided–Wave Photonic Switching; IEE Proceedings—J, vol. 140, No. 5, Oct. 1993, p. 301–307.

Vinchant, J.F. et al., Low Driving Voltage or Current Digital Optical Switch on InP for Multiwavelength System Applications; Electronics Letters, vol. 28, No. 12, Jun. 4, 1992; p. 1135–1137.

Wakita, K. et al., Long Wavelength Waveguide Multiple Quantum Well Optical Modulators; IEEE Journal of Quantum Electronics, vol. QE–23, No. 12, Dec. 1987, p. 2210–2215.

Wanru, Z. et al., Total Internal Reflection Optical Switch with Injection Region Isolated by Oxygen Ion Implementation; p. 1–10.

Yamada, et al., Cross Talk Reduction in a 10 GHz Spacing Arrayed–Waveguide Grating by Phase–Error Compensation, Journal of Lightwave Technology, Mar. 1998, vol. 16, No. 3, pp. 364–371.

Yanagawa, H. et al., Polarization–and Wavelength–Insensitive Guided–Wave Optical Switch with Semiconductor Y Junction; Journal of Lightwave Technology, vol. 8, No. 8, Aug. 1990, p. 1192–1197.

Yu, S. et al., High Speed All–Optical Packet Routing Using A Vertical Coupler Crosspoint Space Switch.

Yu, S. et al., Ultralow Cross–Talk, compact integrated optical crosspoint space with arrays employing active InGaAsP/InP Vertical Waveguide Couplers, Integrated Optical Crosspoint Switch Arrays, Siyuan Yu et a, CPD24–2.

Zengerle, R. et al., Tapered Twin Waveguides For Spot–Size Transformation In InP; TheB2–5; IOOC 95; p. 50–51.

Zirngibl, M. et al., Digitally Tunable Laser Based On The Integration Of A Waveguide Grating Multiplexer And An Optical Amplifier, IEEE Photonics Technology Letters, Apr. 1994, vol. 6, No. 4, pp. 516–517.

Zucker, J.E. et al., Strained Quantum Wells for Polarization–Independent Electrooptic Waveguide Switches, Journal of Lightwave Technology, vol. 10, No. 12, Dec. 1992, p. 1926–1930.

* cited by examiner

US 6,792,180 B1

OPTICAL COMPONENT HAVING FLAT TOP OUTPUT

RELATED APPLICATIONS

This application claims the benefit of U.S. Provisional patent application serial No. 60/278,657, filed on Mar. 20, 2001, entitled "Demultiplexer Having a Flat Top Output" and incorporated herein in its entirety.

BACKGROUND

1. Field of the Invention

The invention relates to one or more optical networking components. In particular, the invention relates to demultiplexers.

2. Background of the Invention

The wavelength division multiplexing technique allows a waveguide to carry more than one channel of information in a multichannel beam of light. Each channel is carried on a light signal having a unique wavelength.

A demultiplexer is typically employed to separate the channels in a multichannel beam. Separating the channels allows the channels to be independently processed. The demultiplexer receives the multichannel beam on an input waveguide and outputs each of the channels on a different output waveguide. Accordingly, each output waveguide is typically associated with a particular channel.

The intensity versus wavelength profile of the light in each output waveguide typically peaks at the wavelength associated with a particular channel. However, the wavelengths of light that appears on a particular output waveguide can shift. For instance, temperature changes can affect the index of refraction of materials in the demultiplexer. This change in the index of refraction can cause the wavelengths of light that appear on an output waveguide to shift. This shift can cause the intensity distribution seen on a particular output waveguide to shift away from the peak in the intensity versus wavelength profile. As a result, these shifts can a drop in the intensity of the signal in a particular output channel. This drop in the intensity is a source of optical loss in the optical network.

For the above reasons, there is a need for a demultiplexer that is not associated with optical losses that result from a shift in the wavelengths of light that are provided on a particular output waveguide.

SUMMARY OF THE INVENTION

The invention relates to a wavelength based optical component. The component includes a plurality of output waveguides and a light distribution component configured to focus a light signal on one of the output waveguides. The light distribution component focuses the light signal such that the light signal has a substantially flat top shaped intensity versus wavelength profile. In some instances, the light signal has a substantially square shaped intensity versus wavelength profile.

Another embodiment of the optical component includes an array of array waveguides. The optical component also includes a first light distribution component configured to distribute a first light signal to the array waveguides. The first light signal is distributed such that a fraction of the first light signal enters each array waveguide. Because the first light signal is divided over the array waveguides, at least a portion of the array waveguides each carry a light signal fraction. The optical component also includes a second light distribution component configured to receive the light signal fractions from the array waveguides. The light signal fractions are received so they combine to form a second light signal with a periodic intensity distribution.

Another embodiment of the optical component includes a second light distribution component and an array of array waveguides. Each array waveguide is configured to deliver a light signal fraction into the light distribution component such that the light signal fractions combine to form a light signal in the light distribution component. The light signal formed with a periodic intensity distribution.

Yet another embodiment of the optical component includes an array of array waveguides. Each array waveguide is configured to receive a fraction of a first light signal. The array waveguides are configured such that light signal fractions exiting the array waveguides combine to form a second light signal having a periodic intensity distribution. The optical component also includes a first light distribution component configured to distribute the first light signal to the array waveguides.

Still another embodiment of the optical component includes a light distribution component and an array waveguide grating having a plurality of array waveguides in optical communication with the light distribution component. The optical component also includes a plurality of attenuators. Each attenuator is configured to attenuate a light signal carried by one of the array waveguides.

A further embodiment of the optical component includes a light distribution component and an array waveguide grating having a plurality of array waveguides in optical communication with the light distribution component. At least a portion of the array waveguides have an inlet port and an outlet port with different cross sectional sizes.

The invention also relates to a method of operating an optical component. The method includes receiving a first light signal and converting the first light signal to a second light signal having a periodic intensity distribution.

In some instances, the periodic intensity distribution approximates a sinc function.

DETAILED DESCRIPTION OF THE PREFERRED EMBODIMENT

The present invention relates to an optical component having an array waveguide grating. One example of an optical component having an array waveguide grating is demultiplexer configured to separate the channels of a multi-channel beam. Each channel is carried on a particular output waveguide. The demultiplexer is constructed so each signal on an output waveguide has a flat top intensity versus wavelength profile. Because the signals associated with each channel have a flat top shape, a shift in the wavelengths of light that are carried by a particular output waveguide do not result in a drop in the intensity of light carried in the output waveguide. Accordingly, the demultiplexer is associated with a reduced degree of optical loss resulting from shifts in the wavelengths carried on a particular output waveguide.

Figure 1A:
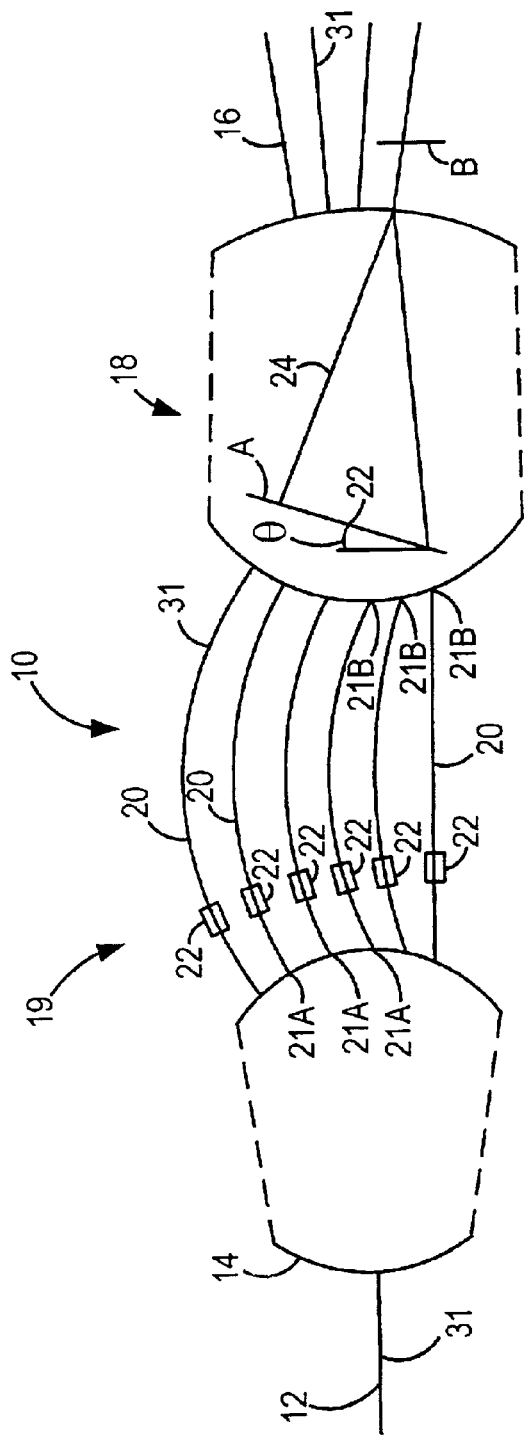
FIG. 1A illustrates an optical component having an array waveguide grating connecting a first first light distribution component with a second first light distribution component. The array waveguide grating includes a plurality of array waveguides. Each array waveguide is configured to carry a fraction of a first light signal from the first first light distribution component to the second first light distribution component.

FIG. 1A illustrates an embodiment of a demultiplexer 10. The demultiplexer 10 includes at least one input waveguide 12 in optical communication with a first light distribution component 14 and a plurality of output waveguides 16 in optical communication with a second light distribution component 18. A suitable first light distribution component 14 and/or second light distribution component 18 includes, but is not limited to, star couplers and Rowland circles, multimode interference devices, mode expanders and slab waveguides.

An array waveguide grating 19 connects the first light distribution component 14 and the second light distribution component 18. The array waveguide grating 19 includes a plurality of array waveguides 20. Each of the array waveguides 20 has an inlet port 21A and an outlet port 21B. Adjacent waveguides in the array have a different effective length. The effective length differential between adjacent waveguides is a constant, ΔL. Although six array waveguides 20 are illustrated, demultiplexers 10 typically include many more than six array waveguides 20 and fewer are possible. Increasing the number of array waveguides 20 can increase the degree of resolution provided by the array waveguide grating 19.

The array waveguides 20 each include an attenuator 22 configured to reduce the intensity of light signals carried in the array waveguide 20. Although each array waveguide 20 is shown as having an attenuator 22, a portion of the array waveguides 20 can have an attenuator 22 as disclosed below.

A single channel light signal is considered for the purposes of simplifying the discussion of operation of the demultiplexer 10. A single channel first light signal enters the first light distribution component 14 from the input waveguide 12. The first light distribution component 14 distributes the light signal to the array waveguides 20. Each array waveguide 20 receives a fraction of the first light signal. Each array waveguide 20 carries the received light signal fraction to the second light distribution component 18. A light signal fraction traveling through a long array waveguide 20 will take longer to enter the second light distribution component 18 than a light signal fraction light traveling through a shorter array waveguide 20. Unless the length differential, ΔL, between adjacent waveguides is a multiple of the light wavelength, the light signal fraction traveling through a long array waveguide 20 enters the second light distribution component 18 in a different phase than the light signal fraction traveling along the shorter array waveguide 20.

The light signal fraction entering the second light distribution component 18 from each of the array waveguides 20 combines to form a second light signal 24. Because the array waveguide 20 cause a phase differential between the light signal fraction entering the second light distribution component 18 from adjacent array waveguides 20, the second light signal 24 is diffracted at an angle labeled, θ. The second light distribution component 18 is constructed to focus the second light signal 24 on a particular output waveguide 16. The output waveguide 16 on which the second light signal is focused is a function of the diffraction angle, θ. As illustrated in FIG. 1A, the phase differential causes the second light signal 24 to be focused at the output waveguide 16 labeled B.

Because ΔL is a different percentage of the wavelength, the amount of the phase differential is different for different channels. As a result, different channels are diffracted at different angles and are accordingly focused on different output waveguides 16. Hence, when a multichannel beam enters the second light distribution component 18, each of the different channels is focused on a different output waveguide 16.

Figure 1B:
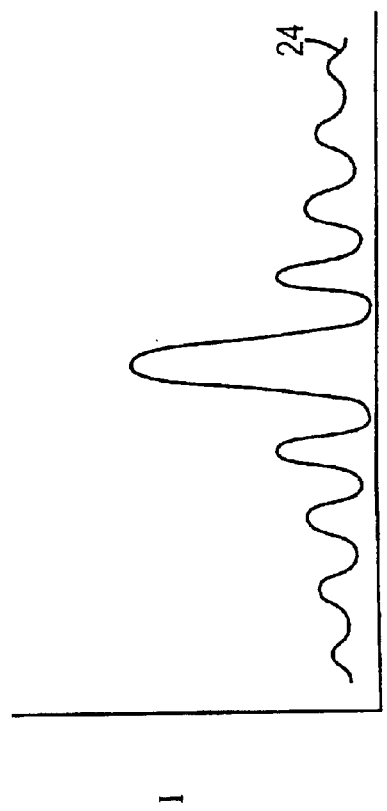
FIG. 1B illustrates the intensity distribution of a second light signal that results when the light signal fractions combine in the second light distribution component. The intensity distribution approximates the shape of a sinc function.
Figure 1C:
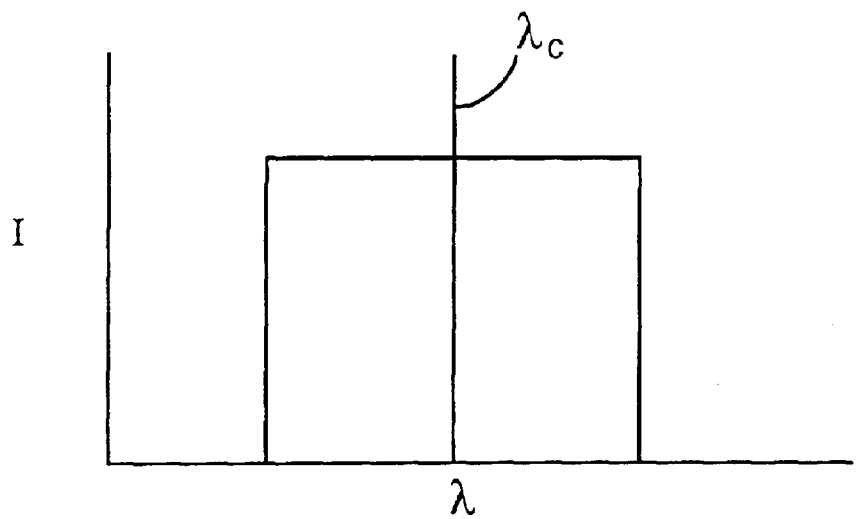
FIG. 1C illustrates the intensity versus wavelength profile that appears in an output waveguide when the second light distribution component focuses the second light signal of FIG. 1B on the output waveguide.

The waveguide grating array is configured such that the second light signal is formed with an intensity distribution that approximates a desired intensity distribution. In some instances, the desired intensity distribution is a periodic function. In some instances, the desired intensity distribution is a sinc function. FIG. 1B illustrates the approximate intensity distribution of a second light signal having an approximately sinc shaped intensity distribution. Simulations show that when the second light signal is formed in the second light distribution component 18 with an intensity distribution approximating a sinc function, the intensity versus wavelength profile that appears on the output waveguides 16 has a substantially square shape or a substantially flat top shape. FIG. 1C illustrates the intensity versus wavelength profile of the second light signal taken at the line labeled B in FIG. 1A.

Figure 2:
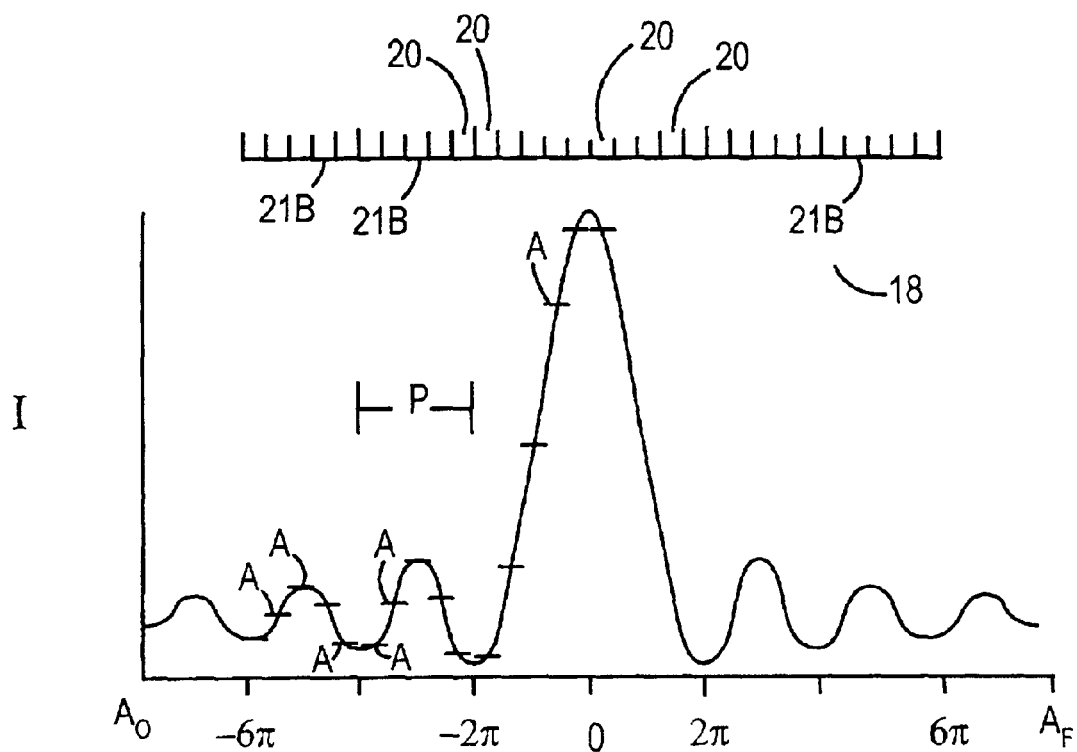
FIG. 2 illustrates the desired intensity of the light signal fractions that needs to be produced by each array waveguide in order to approximate a light signal having a desired intensity distribution.

FIG. 2 illustrates the output port of a plurality of array waveguides 20 positioned over a desired intensity distribution of a second light signal. The position of each outlet port over a portion of the intensity distribution indicates the approximate position that outlet port occupies relative to the desired second light signal. For the purposes of illustration, the output ports are illustrated as being positioned immediately adjacent to one another. However, the demultiplexer 10 is typically constructed with a space between adjacent output ports. For the purposes of illustration there are five output ports associated with each period of the sinc shaped intensity distribution. However, the array waveguide grating 19 can be constructed so a different number of array waveguides 20 are associated with each period of the sinc function. In some instances, there are more than two array waveguides 20 per period, more than three array waveguides 20 per period, or more than four array waveguides 20 per period. Additionally, the number of array waveguides associated with a period can change. For instance, there can be an increased number of array waveguides 20 per period near the center of the sinc function in order to achieve higher resolution of the light signal near the center of the sinc function. Alternatively, the number of array waveguides 20 per period can increase away from the near the center of the sinc function in order to achieve higher resolution of the light signal away from the center of the sinc function. Additionally, FIG. 2 shows the outlet ports 21B for only six periods of the sync function for the purposes of illustration. However, the outlet ports 21B can be associated with a different number of periods. A suitable number of periods includes, but is not limited to, more than two, more than four, or more than six.

Each array waveguide 20 is configured such that the light signal fraction entering the second light distribution component 18 from each array waveguide 20 has a desired intensity. For instance, the horizontal lines labeled A in FIG. 2 shows the desired intensity of the light signal fraction entering the second light distribution component 18 from the outlet port shown directly above the horizontal line. When the light signal fractions enter the second light distribution component 18 having the desired intensity, the second light signal will form with an intensity distribution approximating the desired intensity distribution.

Each array waveguide 20 is associated with the portion of the desired intensity distribution positioned above the outlet port of the array waveguide 20. The portion of the desired intensity distribution associated with an array waveguide 20 can be used to determine the desired intensity of the light signal fraction that should enter the second light distribution component 18 from that array waveguide 20. For instance, the average intensity of the associated portion can be determined and that array waveguide 20 can be configured to produce a light signal fraction having the determined intensity.

A variety of other methods can be used to determine the desired intensity of a light signal fraction that will enter the second light distribution component 18 from each array waveguide 20. For instance, each array waveguide 20 can be configured to produce a light signal having the maximum intensity of the associated portion, the minimum intensity of the associated portion or an average of the minimum intensity and the maximum intensity of the associated portion.

The desired intensity distribution can have one or more regions with negative intensity. For instance, a sinc function has a plurality of regions where a negative intensity is desired. The negative intensity can be achieved by modifying the array waveguide lengths described above such that the array waveguides associated with negative intensities provide a phase shift of about $\pi$ relative to the array waveguide associated with positive intensities. For instance, the array waveguide lengths described above can be modified such that array waveguides associated with negative intensities have an additional length of $\lambda_o/2$ where $\lambda_o$ is the central wavelength. As a result, the length differential between some adjacent waveguides is $\Delta L$ while the length differential between other adjacent waveguides is $\Delta L + \lambda_o/2$ or $\Delta L - \lambda_o/2$. The central wavelength is approximately the median wavelength to be processed by the optical component. In some instances, the central wavelength can be determined by $\lambda_{o,\ vacuum}/n_c$ where $\lambda_{o,\ vacuum}$ is the median wavelength in a vacuum and $n_c$ is the effective index of the channel waveguide 20.

Figure 3A:
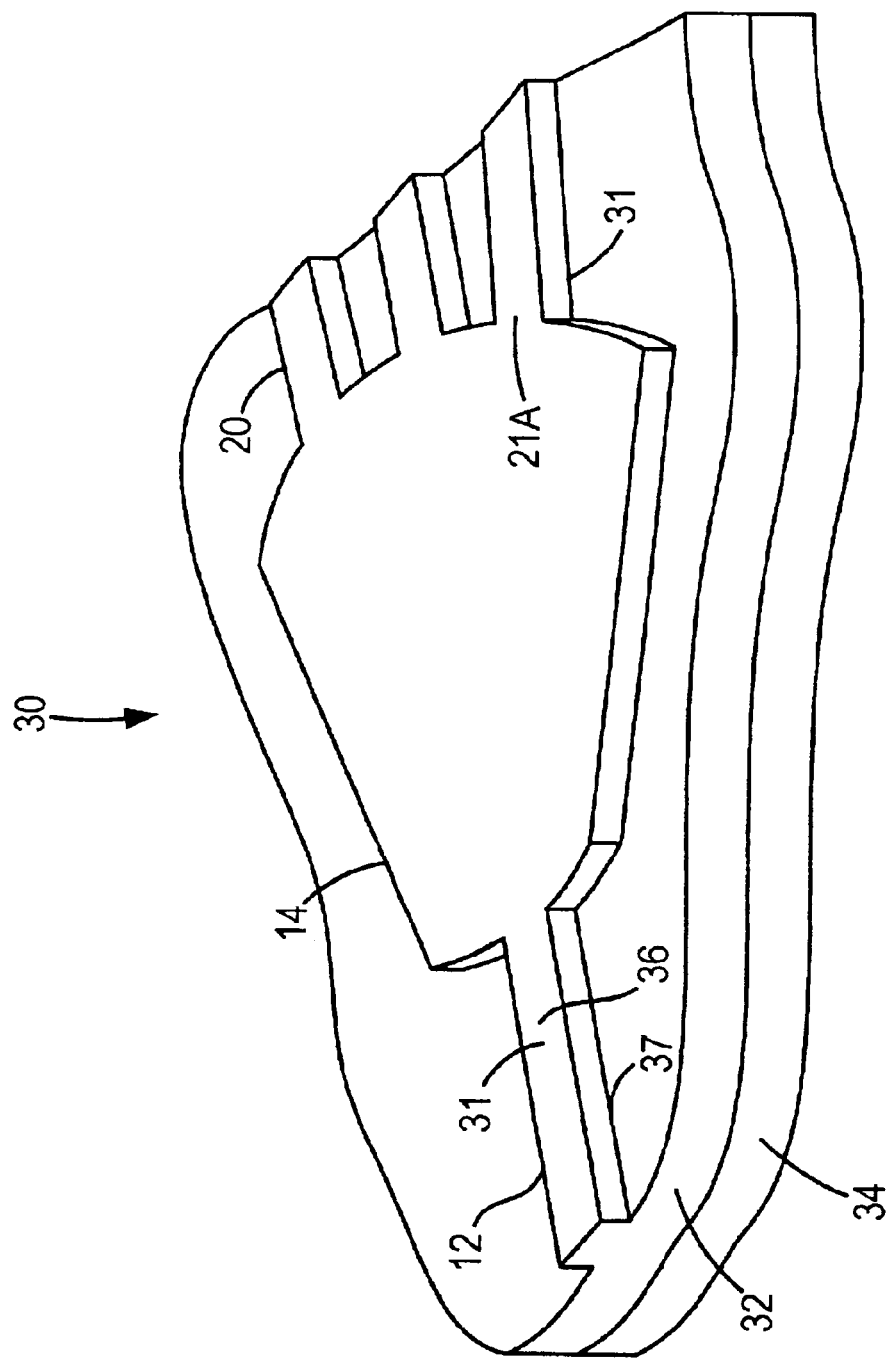
FIG. 3A is a perspective view of a portion of a component having a demultiplexer. The component includes a plurality of waveguides defined in a light transmitting medium positioned adjacent to a base.
Figure 3B:
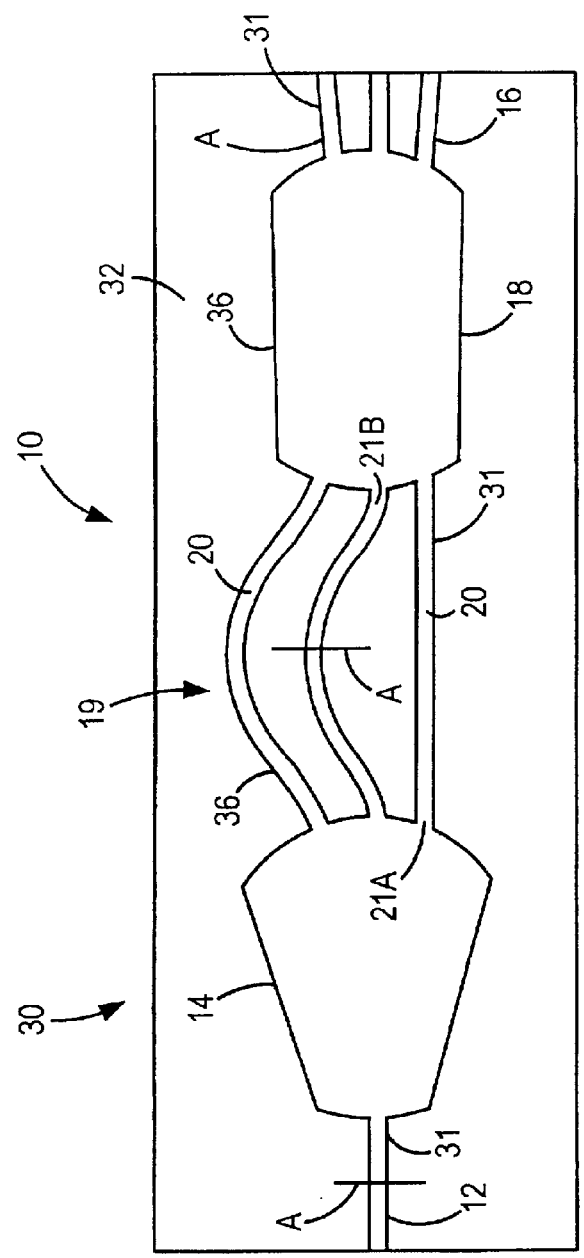
FIG. 3B is a topview of a component constructed according to the construction shown FIG. 3A.
Figure 3C:
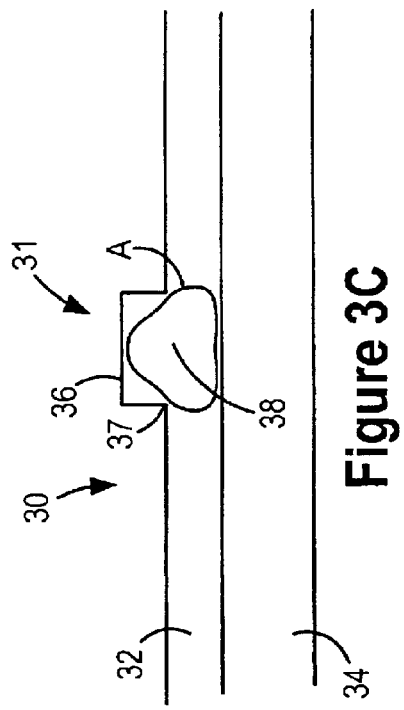
FIG. 3C is a cross section of the component shown in FIG. 3B taken at any of the lines labeled A.

FIG. 3A illustrates a suitable construction for an optical component 30 having a demultiplexer 10 according to the present invention. A portion of the demultiplexer 10 is shown on the component 30. The illustrated portion has a first light distribution component 14, an input waveguide and a plurality of array waveguides 20. FIG. 3B is a top view of an optical component 30 having a demultiplexer 10 constructed according to FIG. 3A. FIG. 3C is a cross section of the component 30 in FIG. 3B taken at any of the lines labeled A. Accordingly, the waveguide 31 illustrated in FIG. 3C could be the cross section of an input waveguide 12, an array waveguide 20 or an output waveguide 16. For purposes of illustration, the demultiplexer 10 is illustrated as having three array waveguides 20 and three output waveguides 16. However, array waveguide gratings 19 for use with a demultiplexer can have many more than three array waveguides 20. For instance, array waveguide gratings 19 can have tens to hundreds or more array waveguides 20. Additionally, demultiplexers can have many more than three output waveguides 16.

The component 30 includes a light transmitting medium 32 formed over a base 34. The light transmitting medium 32 includes a ridge 36 that defines a portion of the light signal carrying region 38 of a waveguide 31. Suitable light transmitting media include, but are not limited to, silicon and silica As will be described in more detail below, the base 34 reflects light signals from the light signal carrying region 38 back into the light signal carrying region 38. As a result, the base 34 also defines a portion of the light signal carrying region 38. The line labeled E illustrates the profile of a light signal carried in the light signal carrying region 38 of FIG. 3C. The light signal carrying region 38 extends through the input waveguide 12, the first light distribution component 14, each the array waveguides 20, the second light distribution component 18 and each of the output waveguides 16.

The array waveguides 20 of FIG. 3B are shown as having a curved shape. A suitable curved waveguide is taught in U.S. patent application Ser. No. 09/756498, filed on Jan. 8, 2001, entitled "An efficient Curved Waveguide" and incorporated herein in its entirety. Other demultiplexer 10 constructions can also be employed. For instance, the principles of the invention can be applied to demultiplexers 10 having straight array waveguides 20. Demultiplexers 10 having straight array waveguides 20 are taught in U.S. patent application Ser. No. 09/724175, filed on Nov. 28, 2000, entitled "A Compact Integrated Optics Based Array Waveguide Demultiplexer" and incorporated herein in its entirety.

Figure 4:
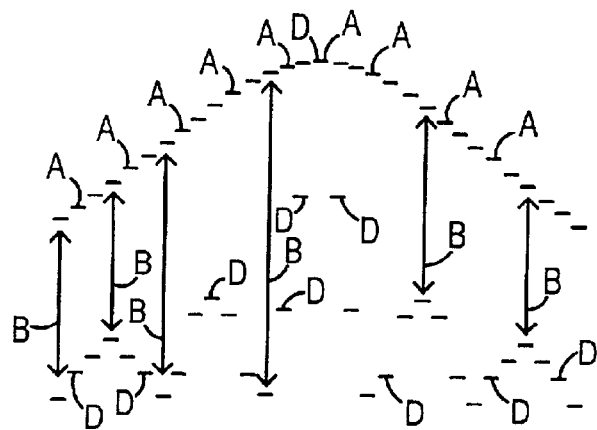
FIG. 4 illustrates the change in the intensity of the light signal fractions needed to achieve a light signal with a desired intensity distribution. The light signal fractions carried in a portion of the array waveguides can be attenuated to achieve the desired intensity.

FIG. 4 illustrates the approximate intensity of the light signal fractions that exit the array waveguides 20 without being attenuated. These intensities are labeled A and are referred to as unadjusted intensities below. FIG. 4 also illustrates the intensities of the light signal fractions that exit the array waveguides 20 that are desired to achieve a desired intensity distribution. The lines labeled D indicate the desired intensities. FIG. 4 also includes a plurality of arrows labeled B. Each arrow indicates the desired intensity and the unadjusted intensity associated with a single array waveguide 20.

The desired intensities are less than or equal to the unadjusted intensities. As a result, each array waveguide 20 can include an attenuator 22 for attenuating the unadjusted intensity of a light signal fraction to the desired intensity. Suitable constructions for array waveguides 20 having attenuators 22 are discussed in more detail below. When the intensity of a light signal fraction produced by an array waveguide 20 matches the desired intensity of a light signal fraction, the array waveguide 20 does not need to include an attenuator 22. Alternatively, an array waveguide 20 producing a light signal fraction matching the desired intensity can include an attenuator 22 for fine tuning the light signal fraction intensity.

In order to achieve a situation where the desired intensity distribution can be achieved with the attenuators 22 placed on each array waveguide 20, the desired intensity distribution can be defined such that the peak intensities of the desired intensity distribution are all equal to or less than the unadjusted intensities.

Figure 5A:
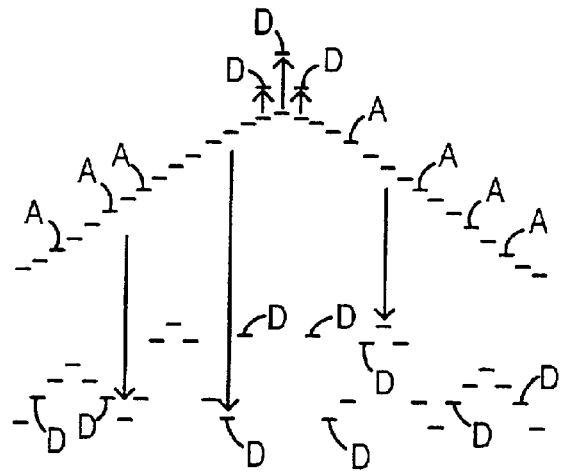
FIG. 5A illustrates the change in the intensity of the light signal fractions needed to achieve a light signal with a desired intensity distribution. The light signal fractions carried in a portion of the array waveguides can be attenuated to achieve the desired intensity while another portion can be amplified to achieve the desired intensity profile.

As illustrated in FIG. 5A, the desired intensity distribution can be defined such that one or more desired intensities exceed the associated unadjusted intensity. The lines labeled A in FIG. 5A illustrate the unadjusted intensities and the lines labeled D illustrate the desired intensities. A portion the desired intensities are greater than the associated unadjusted intensities. This arrangement can result from selecting the desired intensity distribution so as to retain a high signal to noise ratio on the output waveguides 16.

The array waveguides 20 carrying light signal fractions with higher unadjusted intensities than the desired intensity can include an attenuator 22 configured to reduce the intensity of the light signal fractions to the desired intensity. The array waveguides 20 carrying light signal fractions with a higher desired intensity than the unadjusted intensity can be configured to produce a light signal fraction with an increased intensity. For instance, these array waveguide 20 can have an inlet port 21A with an increased cross sectional area relative to the outlet port 21B.

Figure 5B:
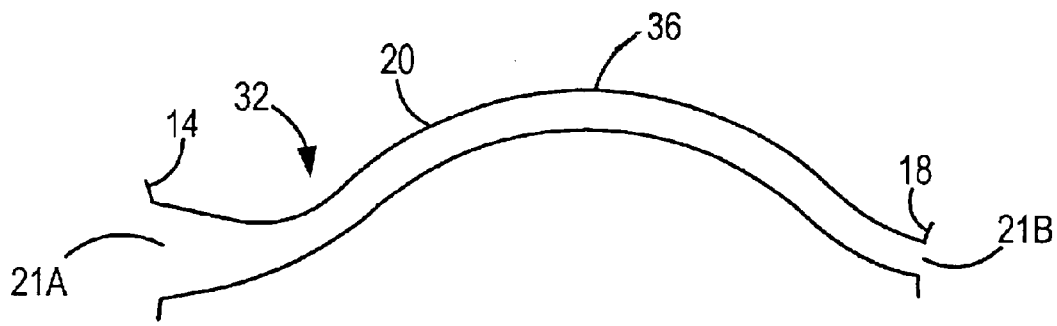
FIG. 5B illustrates one embodiment of an array waveguide constructed so as to increase the intensity of the light signal fraction carried by the array waveguide. The array waveguide has an inlet port with a larger cross sectional area than the outlet port.

FIG. 5B is a top view of an array waveguide 20 having a flared inlet port 21A. Because the array waveguide has a substantially constant thickness along the length of the array waveguide 20, the flared inlet port 21A provides the array waveguide 20 with a cross sectional size that is larger than the cross sectional size of the outlet port 21B. Increasing the size of the inlet port 21A increases the fraction of the first light signal taken in by the array waveguide 20. When the cross sectional size of the outlet port 21B is smaller that the inlet port 21A, the light signal fraction is compressed into a smaller cross section at the outlet port 21B. As a result, the intensity of the light signal fraction exiting the array waveguide 20 increases.

In some instances, only the array waveguides 20 that need to produce a light signal fraction with an intensity that is higher than the unadjusted intensity have an inlet port 21A with a larger cross sectional area than the outlet port 21B. For instance, the middle three array waveguides 20 of FIG. 5A are the only array waveguides 20 that need to have an inlet port 21A with a different cross sectional area than the outlet port 21B. These array waveguides 20 can be configured to produce a light signal fraction with the desired intensity by selecting the appropriate ratio of inlet port 21A cross sectional area to outlet port 21B cross sectional area. Accordingly, these array waveguides 20 need not include an attenuator 22. However, these array waveguides 20 can include an attenuator 22 for fine tuning of the intensity.

In some instances, the ratio of the inlet port 21A cross sectional area to outlet port 21B cross sectional area is selected to provide a light signal fraction intensity that is higher than the desired intensity for all or a portion of the array waveguides 20. These array waveguides 20 can each include an attenuator for bringing the light signal fraction intensity down to the desired level.

Although all the array waveguides 20 can have a ratio of inlet port 21A cross sectional area to outlet port 21B cross sectional area greater than one, this is not necessary when a ratio less than or equal to one provides a light signal fraction intensity greater than or equal to the desired intensity. These array waveguides 20 can include an attenuator 22 to bring attenuate the light signal fraction intensity to the desired intensity. As a result, an array waveguide grating 19 can include array waveguides 20 with different ratios of inlet port 21A cross sectional area to outlet port 21B cross sectional area.

Although the above discussion discloses increasing the ratio of the inlet port 21A cross sectional area to outlet port 21B cross sectional area to greater than one in order to increase the intensity of the light signals carried in an array waveguide 20, the ratio can be decreased in order to decrease the intensity of the light signal carried in an array waveguide 20.

Figure 6:
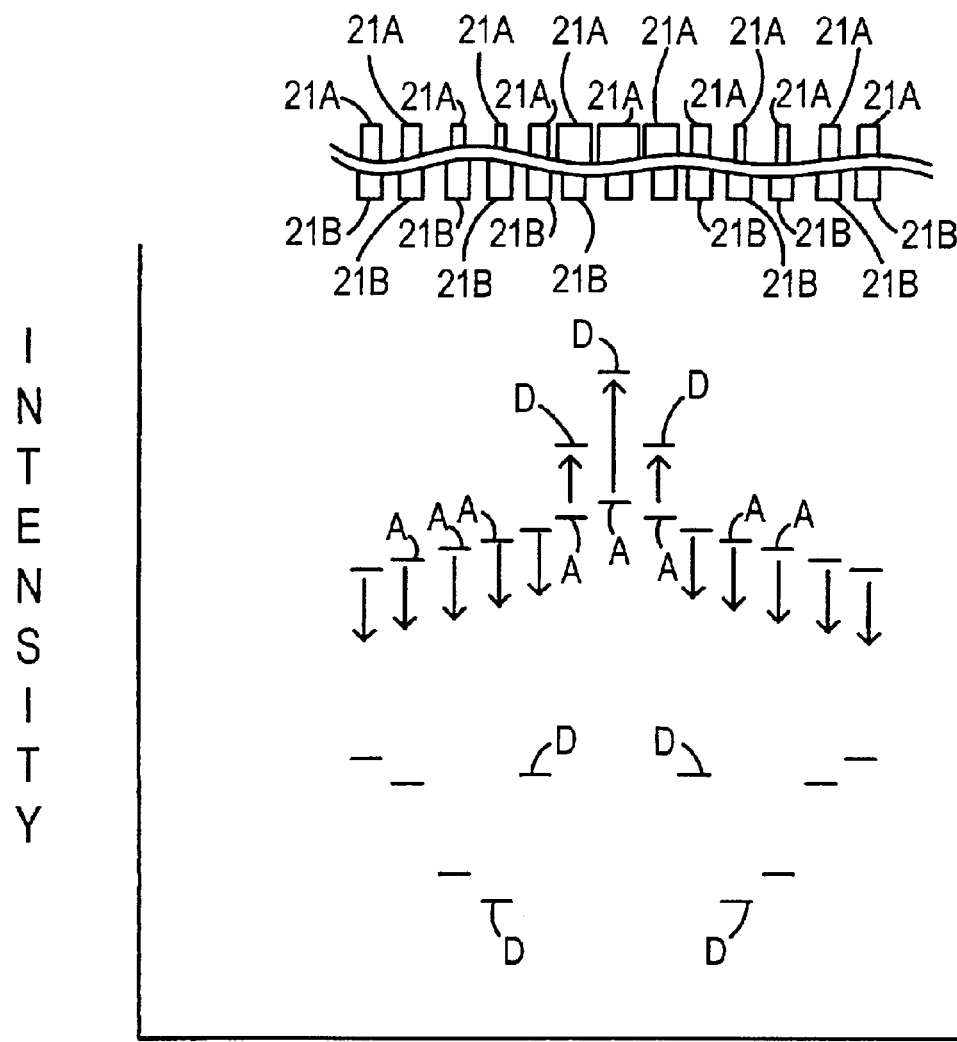
FIG. 6 illustrates the ratio of inlet port to outlet port cross sectional area for a plurality of array waveguides configured to produce a second light signal with a desired intensity distribution.

The array waveguides 20 can be constructed without the need for attenuators 22. For instance, the ratio of inlet port 21A cross sectional area to outlet port 21B cross sectional area for each array waveguide 20 can be selected to produce the desired intensity. FIG. 6 illustrates the width of the inlet port 21A and the outlet port 21B for a plurality of array waveguides 20. Each of the outlet output ports are illustrated as having substantially the same width and accordingly have substantially the same cross sectional size.

The array waveguides 20 of FIG. 6 are shown positioned over an intensity distribution diagram. The lines labeled A illustrate the unadjusted intensity and the lines labeled D illustrate the light signal fraction intensity that results for inlet ports 21A and outlet ports 21B having the illustrated cross sectional ratios. The inlet ports 21A and the outlet ports 21B are sized to provide an intensity distribution that approximates a sinc function. When the desired intensity is larger than the unadjusted intensity, the inlet port 21A has a larger cross sectional area than the outlet port 21B. Further, the size of the inlet port 21A cross sectional area increases as difference between the desired intensity and the unadjusted intensity increases. Additionally, when the desired intensity is less than the unadjusted intensity, the inlet port 21A has a smaller cross sectional area than the outlet port 21B. Further, the size of the inlet port 21A cross sectional area decreases as difference between the desired intensity and the unadjusted intensity increases.

Figure 7A:
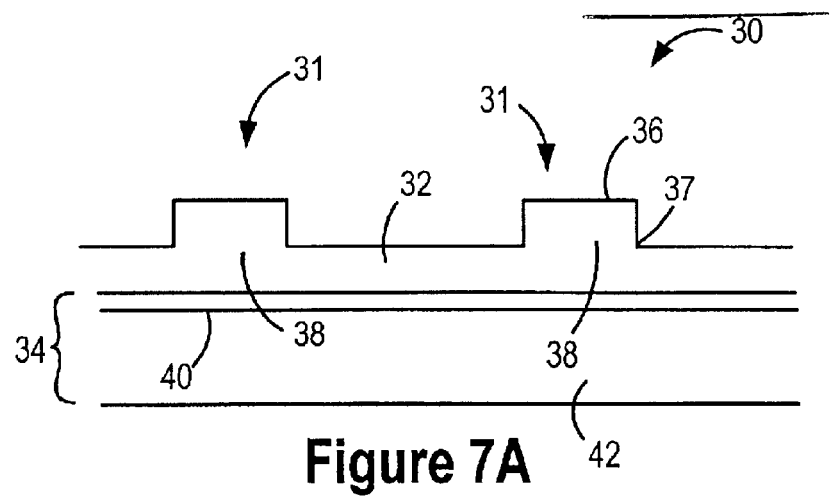
FIG. 7A illustrates a base constructed with a light barrier positioned over a substrate.

The base 34 can have a variety of constructions. FIG. 7A illustrates a component 30 having a base 34 with a light barrier 40 positioned over a substrate 42. The light barrier 40 serves to reflect the light signals from the light signal carrying region 38 back into the light signal carrying region 38. Suitable light barriers 40 include material having reflective properties such as metals. Alternatively, the light barrier 40 can be a material with a different index of refraction than the light transmitting medium 32. The change in the index of refraction can cause the reflection of light from the light signal carrying region 38 back into the light signal carrying region 38. A suitable light barrier 40 would be silica when the light carrying medium and the substrate 42 are silicon. Another suitable light barrier 40 would be air or another gas when the light carrying medium is silica and the substrate 42 is silicon. A suitable substrate 42 includes, but is not limited to, a silicon substrate.

Figure 7B:
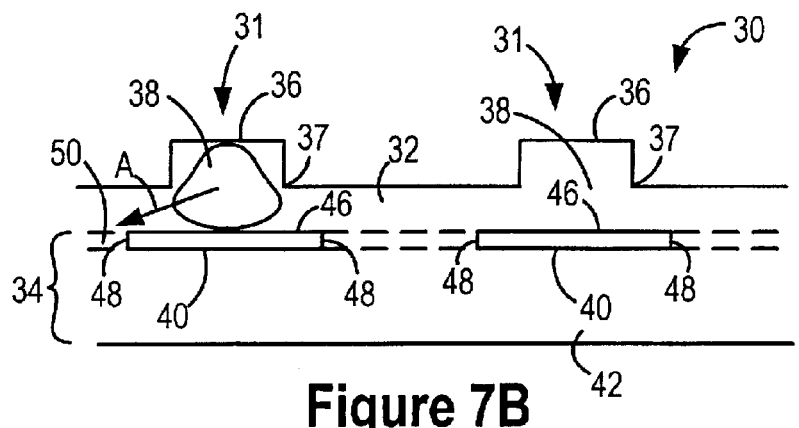
FIG. 7B illustrates a base constructed with a light barrier having a surface positioned between sides. A light signal carrying region is defined adjacent to the surface of the light barrier and a second light transmitting medium is positioned adjacent to the sides of the light barrier.

The light barrier 40 need not extend over the entire substrate 42 as shown in FIG. 7B. For instance, the light barrier 40 can be an air filled pocket 56 formed in the substrate 42. The pocket 56 can extend alongside the light signal carrying region 38 so as to define a portion of the light signal carrying region 38.

In some instances, the light signal carrying region 38 is adjacent to a surface 46 of the light barrier 40 and the light transmitting medium 32 is positioned adjacent to at least one side 48 of the light barrier 40. As a result, light signals that exit the light signal carrying region 38 can be drained from the waveguide 31 as shown by the arrow labeled A. These light signals are less likely to enter adjacent waveguides 31. Accordingly, these light signals are not a significant source of cross talk.

The drain effect can also be achieved by placing a second light transmitting medium 50 adjacent to the sides 48 of the light barrier 40 as indicated by the region below the level of the top dashed line or by the region located between the dashed lines. The drain effect is best achieved when the second light transmitting medium 50 has an index of refraction that is greater than or substantially equal to the index of refraction of the light transmitting medium 32 positioned over the base 34. In some instances, the bottom of the substrate 42 can include an anti reflective coating that allows the light signals that are drained from a waveguide 31 to exit the component 30.

In some instances, the width of the light barrier 40 is larger than 150% of the width of the base 37 of the ridge 36. In other instances, the width of the light barrier 40 is less than 150% of the width of the base 37 of the ridge 36, less than 140% of the width of the base 37 of the ridge 36, less than 130% of the width of the base 37 of the ridge 36, less than 120% of the width of the base 37 of the ridge 36, less than 110% of the width of the base 37 of the ridge 36, less than 100% of the width of the base 37 of the ridge 36.

The input waveguide 12, the first output waveguide 16 and/or the second output waveguide 16 can be formed over a light barrier 40 having sides 48 adjacent to a second light transmitting medium 50.

The drain effect can play an important role in improving the performance of demultiplexers 10 because there are a large number of waveguides 31 formed in close proximity to one another. The proximity of the waveguides 31 tends to increase the portion of light signals that act as a source of cross talk by exiting one waveguide 31 and entering another. The drain effect can reduce this source of cross talk.

Other base 34 and component 30 constructions suitable for use with a demultiplexer 10 according to the present invention are discussed in U.S. patent application Ser. No. 09/686,733, filed on Oct. 10, 2000, entitled "Waveguide Having a Light Drain" and U.S. patent application Ser. No. 09/784,814, filed on Feb. 15, 2001, entitled "Component Having Reduced Cross Talk" each of which is incorporated herein in its entirety.

The light barrier 40 of FIG. 7B can be constructed to act as an attenuator 22. For instance, the width of the light barrier 40 can be reduced until a portion of the light signal leaks from the light signal carrying region 38. Reducing the width of the light barrier 40 increases the degree of attenuation. The attenuation is fixed in that a fixed degree of attenuation occurs for a light signal fraction of a particular intensity.

Figure 7C:
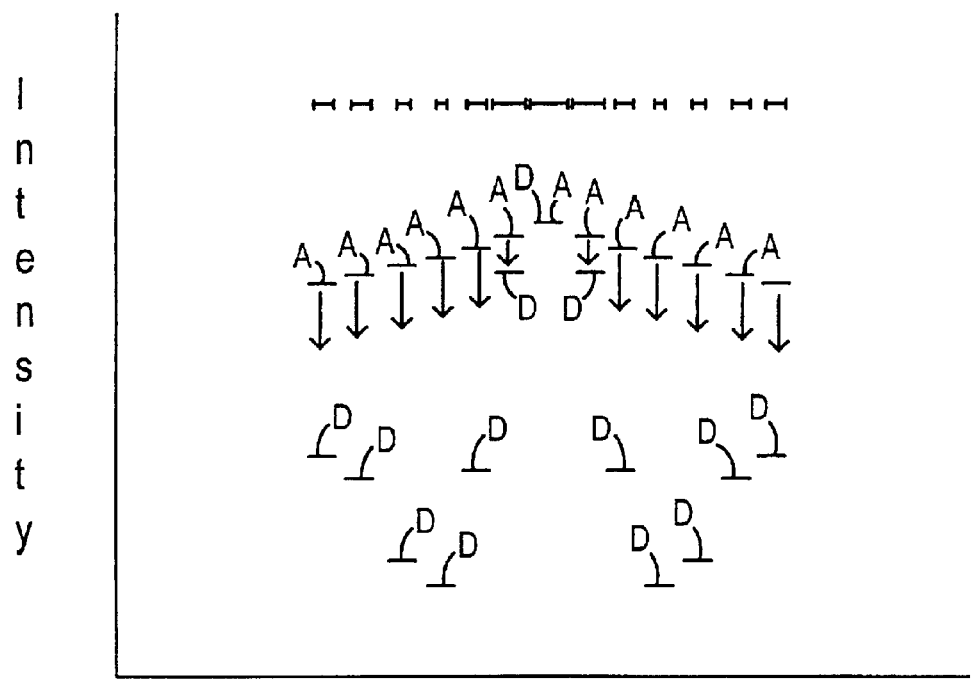
FIG. 7C illustrates the relationship between light barrier width and attenuation of the light signal fraction carried in an array waveguide.

The width of the light barriers 40 for the array waveguides 20 can be selected to provide the second light signal with the desired intensity distribution. FIG. 7C shows light barrier 40 widths for a plurality of array waveguides 20 positioned over an intensity distribution diagram. The lines labeled A illustrate the unadjusted intensities below. The lines labeled D illustrate the light signal fraction intensity that results for array waveguides 20 having the shown light barrier 40 width. These intensities are called the desired intensities below. When the desired intensity matches the unadjusted intensity or is close to the unadjusted intensity, the light barrier 40 has a width on the order of the width that does not provide attenuation. However, when the desired intensity decreases relative to the unadjusted intensity, the light barrier 40 becomes narrower in order to increase the degree of attenuation. As a result, each light barrier 40 width can be selected to produce the desired intensity from each of the array waveguides 20.

Figure 7D:
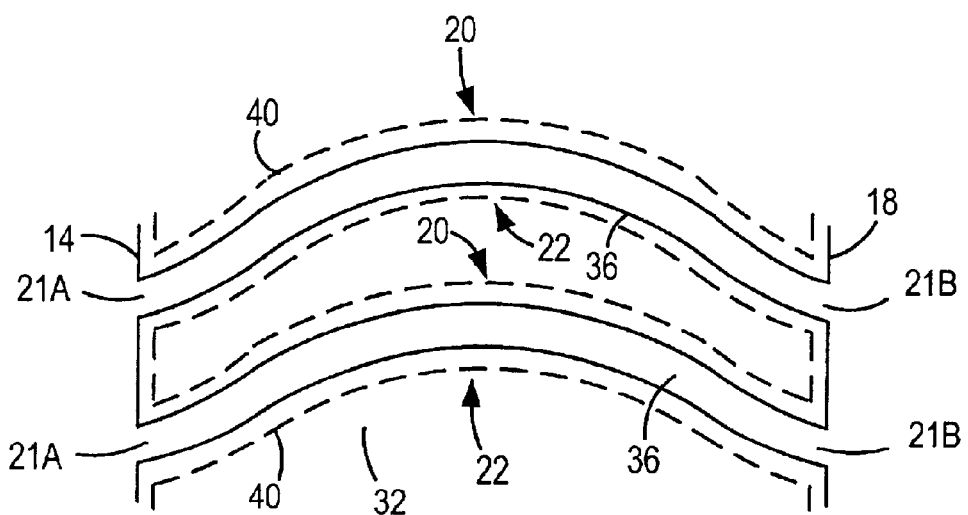
FIG. 7D illustrates a light barrier designed to provide attenuation extending the length of two array waveguides.
Figure 7E:
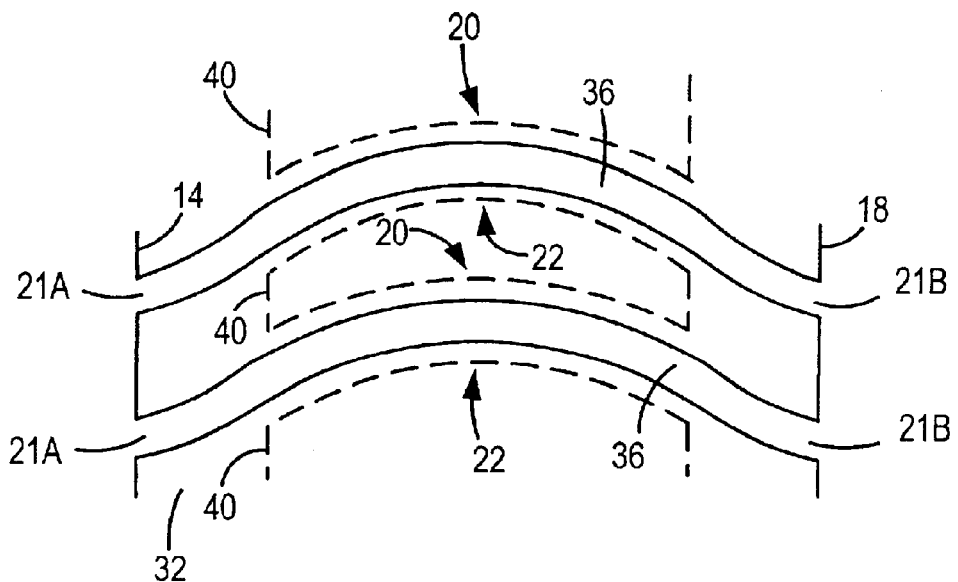
FIG. 7E illustrates a light barrier designed to provide attenuation extending a portion of the length of two array waveguides.

When the light barrier 40 provides attenuation of the light signal fractions, the light barrier 40 can extend the entire length of the each array waveguide 20 as shown in FIG. 7D. FIG. 7D is a top view of a portion of a component having a plurality of array waveguides. The perimeter of the light barrier is illustrated by the dashed lines. The perimeter of the light barrier extends the length of the array waveguides. Alternatively, the portion of the light barrier 40 that provides attenuation can extend only a portion of the length of the array waveguides 20 as shown in FIG. 7E. FIG. 7E is a top view of a portion of a component having a plurality of array waveguides. The perimeter of the light barrier is illustrated by the dashed lines. The perimeter of the light barrier extends along a portion of the length of each array waveguide.

An array waveguide 20 can also be constructed with a light barrier 40 having two different widths. The wider portion of the light barrier 40 can have a width that does not provide substantial attenuation while the narrower portion of the light barrier 40 can provide the necessary attenuation.

As an alternative to varying the widths of the light barrier 40 to provide the desired degree of attenuation, the length of the portion of the light barrier 40 that provides attenuation can be changed to achieve the desired degree of attenuation. For instance, an increased degree of attenuation occurs when the portion of the light barrier 40 responsible for attenuation is increased. Accordingly, all or a portion of the array waveguides 20 can each have a light barrier 40 that is responsible for attenuation with about the same width but different lengths. Further, combinations of different width and different length light barriers 40 that provide attenuation can be employed in a single array waveguide grating 19.

Figure 8A:
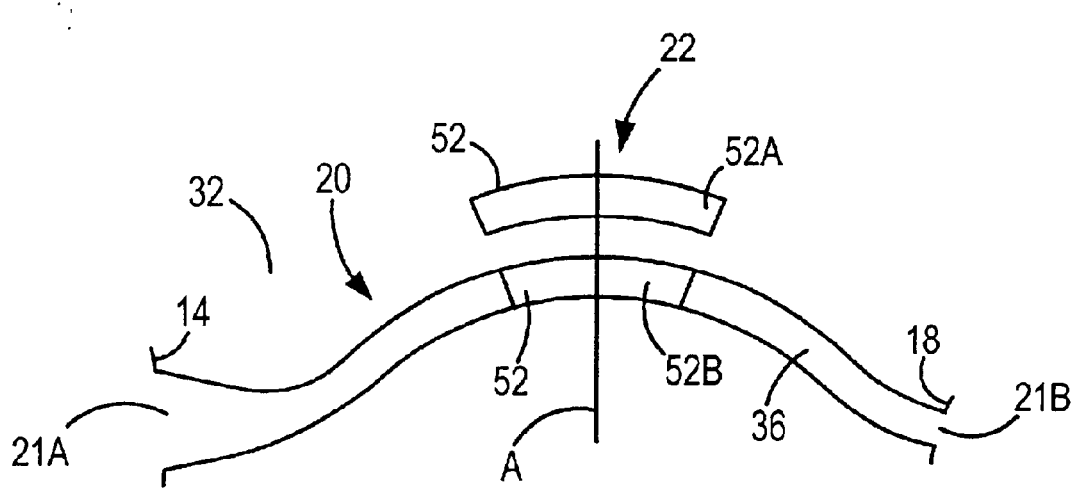
FIG. 8A is a topview of a component having an array waveguide with a variable attenuator.

FIG. 8A illustrates an example of an attenuator 22 that can be used in conjunction with array waveguides 20 such as the array waveguides 20 illustrated in FIG. 3A through FIG. 3C. Although the attenuator 22 is illustrated as being positioned on a curved region of an array waveguide 20 in FIG. 8A, the array waveguide 20 can include one or more straight regions where the attenuator 22 is positioned. The attenuator 22 is a variable attenuator 22 in that the degree of attenuation can be tuned to the desired level. As a result, a demultiplexer 10 having array waveguides 20 with an attenuator 22 according to FIG. 8A allows greater control over the intensity distribution of the second light signal.

A first electrical contact 52A is positioned over the ridge 36 and a second electrical contact 52B is positioned adjacent to a side of the ridge 36. Electrical conductors such as wires can optionally be connected to the electrical contacts 52 for application of a potential between the first electrical contact 52A and the second electrical contact 52B. Forming a metal layer on the component 30 can form the electrical contacts 52. Suitable metals include, but are not limited to, Ni, Cr, Ti, Tungsten, Au, Ct, Pt Al and/or their silicides. The metal layer can be formed to a thickness greater than 0.1 µm, 0.5 µm, 1 µm 1.5 µm or 2 µm.

Figure 8B:
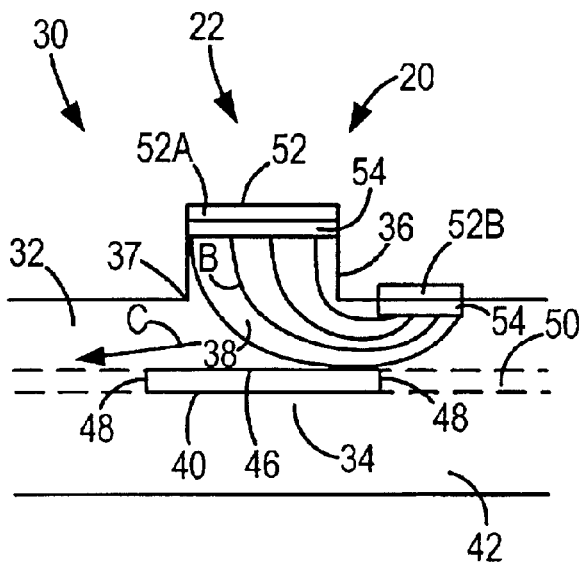
FIG. 8B is a cross section of the component shown in FIG. 8A taken at the line labeled A.

FIG. 8B is a cross section of the attenuator 22 illustrated in FIG. 8A taken at the line labeled A. A doped region 54 is formed adjacent to each of the electrical contacts 52. The doped regions 54 can be N-type material or P-type material. When one doped region 54 is an N-type material, the other doped region 54 is a P-type material. For instance, the doped region 54 adjacent to the first electrical contact 52A can be a P type material while the material adjacent to the second electrical contact 52B can be an N type material. In some instances, the regions of N type material and/or P type material are formed to a concentration of $10^{\wedge}(17-21)/cm^3$ at a thickness of less than 6 µm, 4 µm, 2 µm, 1 µm or 0.5 µm. The doped region 54 can be formed by implantation or impurity diffusion techniques.

During operation of the attenuator 22, a potential is applied between the first electrical contact 52A and the second electrical contact 52B. The potential causes the index of refraction of the first light transmitting medium 32 positioned between the electrical contacts 52 to change as shown by the lines labeled B.

When the potential on the electrical contact 52 adjacent to the P-type material is less than the potential on the electrical contact 52 adjacent to the N-type material, a current flows through the light transmitting medium 32 and the index of refraction decreases. The reduced index of refraction causes at least a portion of the light signals to be reflected out of the light signal carrying region 38 as illustrated by the arrow labeled C. When a second light transmitting medium 50 is positioned adjacent to the sides 48 of the light barrier 40, the light signals can enter the substrate 42 and be drained away from the modulator so they can not enter other waveguides. Because the light signals are reflected out of the light signal carrying region 38, the light signal carrying region 38 carries a reduced portion of the light signals. As a result, a light signal exiting the attenuator 22 has less intensity than the light signal that entered the attenuator 22.

The larger the potential applied between the electrical contacts 52, the higher the degree of attenuation that occurs. As a result, applying a modulation signal with a varying potential to the modulator produces a light signal having a varying intensity.

When the potential on the electrical contact 52 adjacent to the P-type material is greater than the potential on the electrical contact 52 adjacent to the N-type material, the index of refraction of the material positioned between the electrical contacts 52 increases. Accordingly, the retention of the light signal in the region where the index of refraction is changed increases.

Although a portion of the second electrical contact 52B is illustrated as being positioned over the light barrier 40, all or none of the second electrical contact 52B can be positioned over the light barrier 40. Additionally, the attenuator 22 will work in conjunction with a light barrier 40 that is continuous across a substrate 42 as shown in FIG. 8A.

Although the attenuator 22 is illustrated as being constructed with a second light transmitting medium 50 positioned adjacent to the sides 48 of the light barrier 40, the attenuator 22 can also be constructed with a continuous light barrier 40 extending under more than one waveguide as shown in FIG. 7A.

Other embodiments of suitable attenuators 22 and methods of manufacturing are discussed in U.S. patent application Ser. No. 09/765,723, filed on Jan. 18, 2001, entitled "Optical Attenuators" and incorporated herein in its entirety.

FIG. 9A to FIG. 9E illustrate a method for forming a component 30 having a demultiplexer 10. A mask is formed on a base 34 so the portions of the base 34 where a light barrier 40 is to be formed remain exposed. A suitable base 34 includes, but is not limited to, a silicon substrate 42. An etch is performed on the masked base 34 to form pockets 56 in the base 34. The pockets 56 are generally formed to the desired thickness of the light barrier 40.

Air can be left in the pockets 56 to serve as the light barrier 40. Alternatively, a light barrier 40 material such as silica or a low K material can be grown or deposited in the pockets 56. The mask is then removed to provide the component 30 illustrated in FIG. 9A.

Figure 9A:
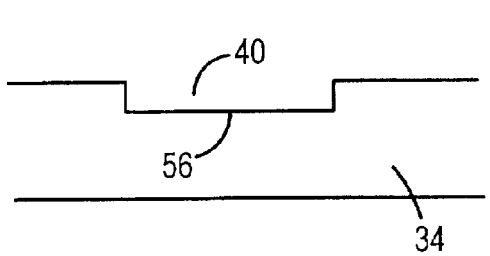
FIG. 9A through FIG. 9E illustrate a method of forming an optical component having an optical component.
Figure 9B:
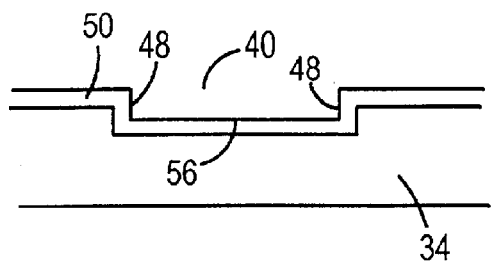

When air is left in the pocket 56, a second light transmitting medium 50 can optionally be deposited or grown over the base 34 as illustrated in FIG. 9B. When air will remain in the pocket 56 to serve as the light barrier 40, the second light transmitting medium 50 is deposited so the second light transmitting medium 50 is positioned adjacent to the sides 48 of the light barrier 40. Alternatively, a light barrier 40 material such as silica can optionally be deposited in the pocket 56 after the second light transmitting medium 50 is deposited or grown.

The etch employed in the method described above can result in formation of a facet and/or in formation of the sides of a waveguide. These surfaces are preferably smooth in order to reduce optical losses. Suitable etches for forming these surfaces include, but are not limited to, reactive ion etches, the Bosch process and the methods taught in U.S. patent application Ser. No. 09/690,959; filed on Oct. 16, 2000; and entitled "formation of a Smooth Vertical Surface on an Optical Component" which is incorporated herein in its entirety.

The remainder of the method is disclosed presuming that the second light transmitting medium 50 is not deposited or grown in the pocket 56 and that air will remain in the pocket 56 to serve as the light barrier 40. A light transmitting medium 32 is formed over the base 34. A suitable technique for forming the light transmitting medium 32 over the base 34 includes, but is not limited to, employing wafer bonding techniques to bond the light transmitting medium 32 to the base 34. A suitable wafer for bonding to the base 34 includes, but is not limited to, a silicon wafer or a silicon on insulator wafer.

Figure 9C:
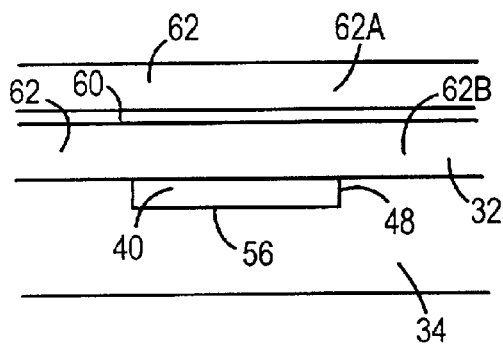
Figure 9D:
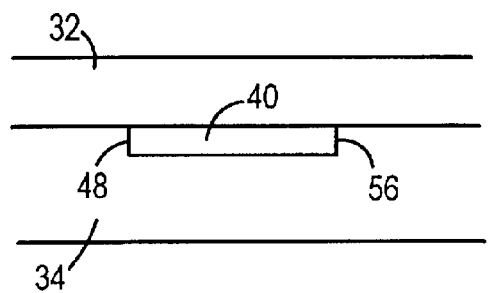

A silicon on insulator wafer includes a silica layer 60 positioned between silicon layers 62 as shown in FIG. 9C. The top silicon layer 62A and the silica layer 60 can be removed to provide the component 30 shown in FIG. 9D. Suitable methods for removing the top silicon layer 62A and the silica layer 60 include, but are not limited to, etching and polishing. The bottom silicon layer 62B remains as the light transmitting medium 32 where the waveguides will be formed. When a silicon wafer is bonded to the base 34, the silicon wafer will serve as the light transmitting medium 32. A portion of the silicon layer 62 can be removed from the top and moving toward the base 34 in order to obtain a light transmitting medium 32 with the desired thickness.

Figure 9E:
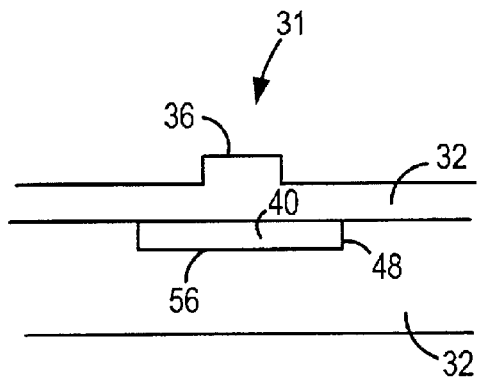

The light transmitting medium 32 is masked such that places where a ridge 36 is to be formed are protected. The component 30 is then etched to a depth that provides the component 30 with ridges 36 of the desired height as shown in FIG. 9E.

Any doped regions 54 to be formed on the ridge 36, adjacent to the ridge 36 and/or under the ridge 36 can be formed using techniques such as impurity deposition, implantation or impurity diffusion. The electrical contacts 52 can then be formed adjacent to the doped regions 54 by depositing a metal layer adjacent to the doped regions 54.

The above description of the demultiplexer 10 is disclosed in the context that each array waveguide 20 receives a portion of the first light signal, however, the demultiplexer 10 can be constructed such that certain array waveguides 20 receive little or none of the first light signal.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical component, comprising:
a light distribution component;
an array of array waveguides, each array waveguide configured to guide a light signal fraction into the light distribution component such that the light signal fractions combine to form a light signal in the light distribution component and
a plurality of light barriers that are each positioned between a substrate and an associated array waveguide so as to define a portion of the associated array waveguide, the light barriers configured such that light signal fractions are at least partially drained from one or more of the array waveguides such that the light signal is formed in the light distribution component with a periodic intensity distribution.

2. The optical component of claim 1, wherein the light distribution component is configured to focus the light signal on an output waveguide.

3. The optical component of claim 1, further comprising: one or more output waveguides configured to receive the light signal from the light distribution component.

4. The optical component of claim 1, wherein the light distribution component is configured to focus the light signal on an output waveguide such that the light signal has a substantially flat top shaped intensity versus wavelength profile.

5. The optical component of claim 1, wherein the periodic intensity distribution approximates a sinc function.

6. The optical component of claim 1, wherein at least a portion of the array waveguides include a variable attenuator.

7. The optical component of claim 1, wherein the array waveguides each have an inlet port and an outlet port, one or more of the array waveguides having an outlet port with a different cross sectional area than the inlet port.

8. The optical component of claim 1, wherein at least a portion of the light barriers associated with different array waveguides have different widths, the width of a light barrier being measured along an axis parallel to an axis that is perpendicular to the associated array waveguide.

9. The optical component of claim 1, wherein the array waveguides are formed in a first light transmitting medium positioned over the light barriers, and
a second light transmitting medium is positioned between adjacent light barriers.

10. The optical component of claim 1, wherein the second light transmitting medium has an index of refraction greater than or equal to the index of refraction of the first light transmitting medium.

11. The optical component of claim 1, wherein at least one light barriers is spaced apart from an adjacent light barrier.

12. An optical component, comprising:
an array of array waveguides being partially defined by light barriers that are each positioned between a substrate and an associated array waveguide;
a first light distribution component configured to distribute a first light signal to the array waveguides such that a fraction of the first light signal enters each array waveguide as a light signal fraction; and
a second light distribution component configured to receive the light signal fractions from the array waveguides, one or more of the light barriers configured such that the light signal fraction guided alone the associated array waveguide at least partially drains from the associated waveguide, the light barriers configured to drain the light signal fractions such that the light signal fractions received in the second light distribution component combine to form a second light signal with a periodic intensity distribution.

13. The optical component of claim 12, wherein the second light distribution component is configured to focus the second light signal on an output waveguide.

14. The optical component of claim 13, wherein the output waveguide is one of a plurality of output waveguides.

15. The optical component of claim 13, wherein the second light distribution component is configured to focus the second light signal on an output waveguide such that the second light signal has a substantially flat top shaped intensity versus wavelength profile on the output waveguide.

16. The optical component of claim 12, wherein the periodic intensity distribution approximates a sinc function.

17. The optical component of claim 12, wherein at least a portion of the array waveguides include a variable attenuator.

18. The optical component of claim 10, wherein the array waveguides each have an inlet port and an outlet port, one or more of the array waveguides having an outlet port with a different cross sectional area than the inlet port.

19. The optical component of claim 12, wherein the first light distribution component is configured to receive the first light signal from at least one input waveguide.

20. The optical component of claim 12, wherein at least a portion of the light barriers associated with different array waveguides have different widths, the width of a light barrier being measured along an axis parallel to an axis that is perpendicular to the associated array waveguide.

21. The optical component of claim 12, wherein the array waveguides are formed in a first light transmitting medium positioned over the light barriers, and a second light transmitting medium is positioned between adjacent light barriers.

22. The optical component of claim 12, wherein the second light transmitting medium has an index of refraction greater than or equal to the index of refraction of the first light transmitting medium.

23. The optical component of claim 12, wherein at least one light barriers is spaced apart from an adjacent light barrier such that a portion of the light signal fraction traveling along the associated array waveguide drains through a region between the at least one light barrier and the adjacent light barrier.

24. An optical component, comprising:

an array of array waveguides that are each configured to receive a fraction of a first light signal, a plurality of the array waveguide partially defined by light barriers that are each positioned between a substrate and an associated array waveguide, one or more of the light barriers configured such that the light signal fraction guided along the associated array waveguide at least partially drains from the associated waveguide, the light barriers configured to drain the light signal fractions such that light signal fractions exiting the array waveguides combine to form a second light signal having a periodic intensity distribution; and a first light distribution component configured to distribute the first light signal to the array waveguides.

25. The optical component of claim 24, wherein the periodic intensity distribution approximates a sinc function.

26. The optical component of claim 24, wherein at least a portion of the array waveguides include a variable attenuator.

27. The optical component of claim 24, wherein the array waveguides each have an inlet port and an outlet port, one or more of the array waveguides having an outlet port with a different cross sectional area than the inlet port.

28. The optical component of claim 24, wherein the first light distribution component is configured to receive the first light signal from at least one input waveguide.

29. The optical component of claim 24, wherein at least a portion of the light barriers associated with different array waveguides have different widths, the width of a light barrier being measured along an axis parallel to an axis that is perpendicular to the associated array waveguide.

30. The optical component of claim 24, wherein the array waveguides are formed in a first light transmitting medium positioned over the light barriers, and a second light transmitting medium is positioned between adjacent light barriers.

31. The optical component of claim 24, wherein the second light transmitting medium has an index of refraction greater than or equal to the index of refraction of the first light transmitting medium.

32. The optical component of claim 24, wherein at least one light barriers is spaced apart from an adjacent light barrier such that a portion of the light signal fraction traveling along the associated array waveguide drains through a region between the at least one light barrier and the adjacent light barrier.

* * * * *